United States Patent
Shukla et al.

(10) Patent No.: US 10,251,246 B2
(45) Date of Patent: Apr. 2, 2019

(54) CONNECTED LIGHTING NETWORK ARCHITECTURE

(71) Applicants: Vimlesh Shukla, Vernon Hills, IL (US); Alan Sarkisian, Marblehead, MA (US)

(72) Inventors: Vimlesh Shukla, Vernon Hills, IL (US); Alan Sarkisian, Marblehead, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 34 days.

(21) Appl. No.: 15/599,624

(22) Filed: May 19, 2017

(65) Prior Publication Data
US 2018/0338370 A1 Nov. 22, 2018

(51) Int. Cl.
*H05B 37/02* (2006.01)
*G05B 19/042* (2006.01)

(52) U.S. Cl.
CPC ..... *H05B 37/0272* (2013.01); *G05B 19/0421* (2013.01); *H05B 37/029* (2013.01)

(58) Field of Classification Search
CPC combination set(s) only.
See application file for complete search history.

(56) References Cited

U.S. PATENT DOCUMENTS

| | | | |
|---|---|---|---|
| 5,629,587 A | 5/1997 | Gray et al. | |
| 6,175,771 B1 | 1/2001 | Hunt et al. | |
| 6,548,967 B1 | 4/2003 | Dowling et al. | |
| 7,623,042 B2 | 11/2009 | Huizenga | |
| 8,519,830 B2 | 8/2013 | Julio | |
| 8,731,689 B2 | 5/2014 | Platner et al. | |
| 8,732,031 B2 | 5/2014 | Martin et al. | |
| 2017/0251540 A1* | 8/2017 | Van Der Brug ... | H05B 37/0254 |

* cited by examiner

*Primary Examiner* — Douglas W Owens
*Assistant Examiner* — Jianzi Chen
(74) *Attorney, Agent, or Firm* — Yutian Ling

(57) ABSTRACT

A connected lighting fixture network system has a plurality of multi-channel lighting fixtures that communicate over a network. Each lighting fixture (device) may access a plurality of services that reside within an application layer of the device, or on a server accessible to the device. A controller is coupled to the device and configured to send query and command messages to the device and to receive reply messages from the device. A query message from the controller can request information about the device. In response to receiving the reply message, the controller can generate a command message and send the command message to the device. The services available to the device may include network discovery, device health, device status, software versioning, and lighting command and control.

17 Claims, 10 Drawing Sheets

CONNECTED LIGHTING NETWORK ARCHITECTURE

FIELD OF THE DISCLOSURE

The present disclosure relates to systems having a plurality of multi-channel lighting fixtures.

BACKGROUND

Current lighting solutions allow for the operation and control of multiple channel fixtures from a single point of control. Lighting control standards are able to address up to 64, and 512 different channel fixtures, for example. Traditionally, a controller and the lighting fixtures operate in an open-loop where a single message is transmitted from the controller to the lighting fixtures.

DETAILED DESCRIPTION

Figure 1:
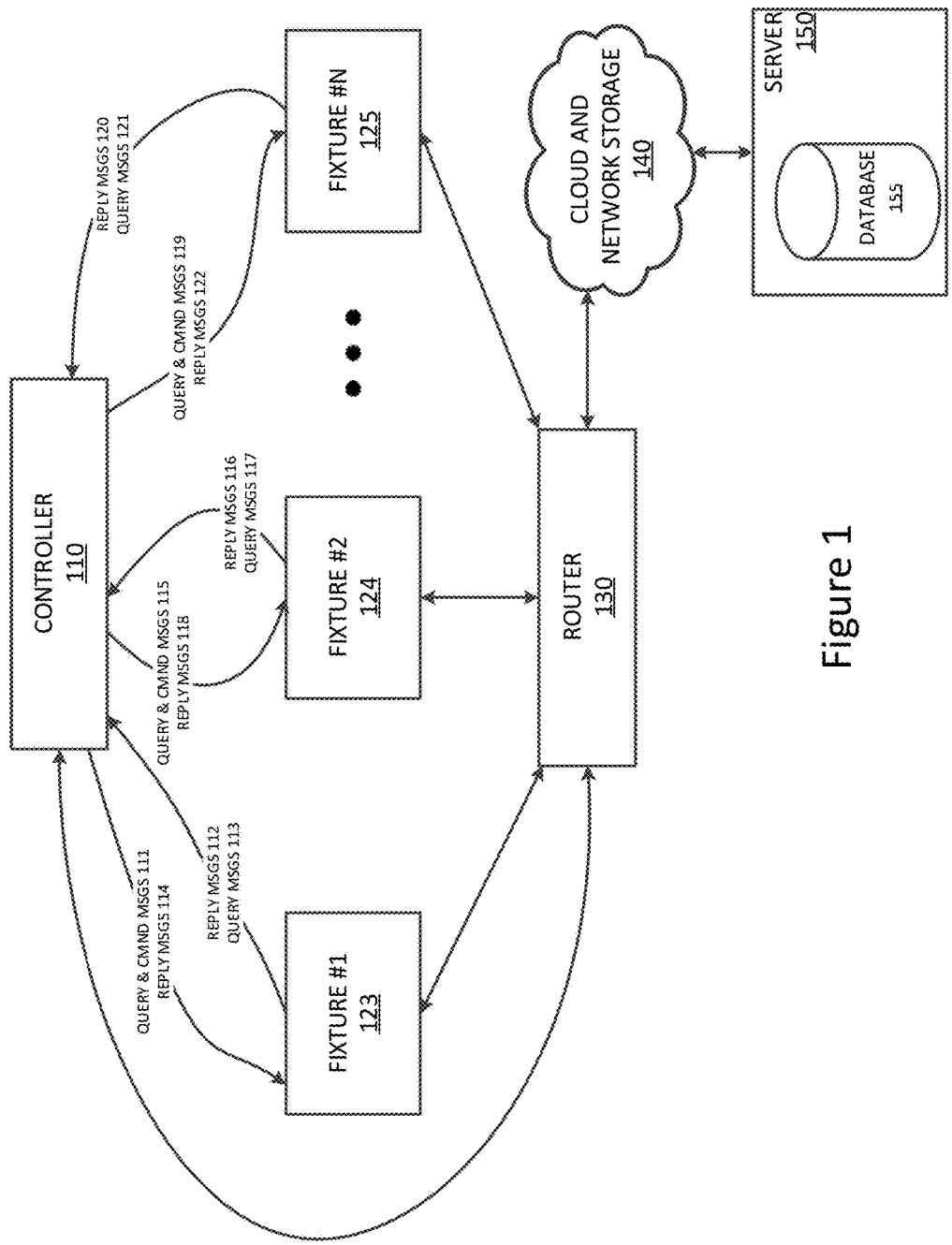
FIG. 1 illustrates an example block diagram of a connected lighting network architecture system having a plurality of lighting fixtures communicatively coupled to a controller, configured in accordance with an embodiment of the present disclosure.

A connected lighting network system and message-based communication architecture are disclosed. In an embodiment, the system includes a plurality of multi-channel lighting fixtures that communicate over a network using unique messages generated by a controller of the system. The system allows for bi-directional communication between devices (e.g., lighting fixtures) and the controller to provide closed-loop communication. The system uses the state of the lighting fixture to reduce overall bandwidth of the communication between the controller and the devices. In more detail and according to an example embodiment, the system implements a plurality of services that reside in an application layer of the controller and the device, the services including a network discovery service, a device health service, a device status service, a software versioning service, and a lighting command and control service. In other embodiments, some of these core services (any or all of network discovery service, device health service, device status service, and software versioning service) can be implemented at least in part on a remote server. In such embodiments, reference to the client generally refers to the controller (or other intelligent device) local to the fixture being controlled and monitored. As will be further appreciated, the controller may be integrated with a given fixture or otherwise communicatively coupled to the fixture via a communication link (wired or wireless). The network discovery service provides a query message from the controller (or server) to the lighting fixture, so as to discover the presence of the lighting fixture. Once discovery is complete, the lighting fixture is considered a known lighting fixture. The device health service provides a query message from the controller (or server) to the lighting fixture, and the lighting fixture replies with a return message, whereby the total number of replies can be tallied by the controller or the server to evaluate the connectivity health of the device, and to determine, for example, if communication has been lost due to the controller or the lighting fixture. The device status service queries the lighting fixture for information about the lighting fixture, for example the state of the lighting fixture, temperature, or other factors or information relating to the lighting fixture. The software versioning service queries the lighting fixture/controller and the controller replies with information about its current firmware or software version, which can be used to determine if a firmware or software update may be applied. The lighting command and control service is implemented in the control/fixture and can generate a lighting command and control message, and once the fixture receives the command, it can change the illumination appropriately and report back the illumination level, dimming level, or duty cycle, for example. In some embodiments, the lighting command and control message can include a multi-byte pattern called a Channel Illumination Field (CIF). The CIF indicates which lighting channel is to be commanded or reported, and an illumination payload following the CIF that indicates the desired illumination level, dimming level, or duty cycle for pulse width modulated (PWM) controlled lighting fixtures, thereby reducing the overall data by providing information to the affected channels instead of all channels. For example, the lighting command and control message can include an equal number of illumination level commands and flagged CIF bits when multiple channels are to be changed to differing illumination levels. In still other cases, the lighting command and control message can include a single illumination level in a broadcast message when the intended illumination level is the same across all channels to be changed.

General Overview

Implementing a connected lighting fixture network system involves a number of non-trivial issues, particularly in a space having a plurality of multi-channel lighting fixtures.

These issues include scalability, non-standard communications, hardwired-only connections, lack of bi-directional communications, and open-loop control, to name a few. Most of the fixtures' intelligence reduces down to receiving open-loop commands from a controller to a fixture. In addition to a network scalability issue, existing lighting networks do not provide mechanisms for feedback from the fixture to the controller. The networks are "open-loop" systems in which the controller commands the fixture without knowing the current fixture state. The term open-loop refers to the lack of a feedback mechanism or acknowledgement from the fixture back to controller when a lighting command is given. In addition to this scalability issue, traditional lighting standards require high bandwidth for use. Within traditional lighting standards, all channel data is transmitted for each message, even for the channels that the user is not actually controlling. For example, consider the case of a lighting system with 512 different channels, in which a user may wish to illuminate a single lighting channel out of the entire group. The traditional lighting standard packets will contain illumination information for all 512 channels, even though the user is not adjusting any illumination levels of 511 channels. One solution to this problem is to continue broadcasting the same information, but this blindly assumes that the fixture never received the command initially, and that repetition will correct this issue. There is a need, therefore, for bi-directional communication between the controller and fixture providing information about the state of each fixture, and to provide a networking architecture that can be used for connected fixtures.

To this end, the present disclosure provides a lighting network architecture for lighting control of multiple fixtures in a closed loop system. The architecture is based upon a service-oriented-architecture (SOA) where each device on the network (controller, fixture, etc.) has access to a set of core services. In an embodiment, the core services provide network commissioning and device discovery, device health and QoS (Quality of Service), device status and management, software configuration, and lighting command and control. Each service employs a set of unique messages and activities describing how a lighting controller may control a lighting fixture. Communication is bi-directional between the controller and fixture. The controller sends a packet (for example a 2 byte packet where 1 byte corresponds to the fixture's or group's address, and 1 byte contains the payload) and the fixture can reply with a reply packet (for example, a 1 byte reply package). Manchester encoding can be performed on transmitted bits, but any suitable encoding scheme can be used. As will be further appreciated, error-checking can be used but is not required.

Connected Lighting Fixture Network Architecture

Figure 3:
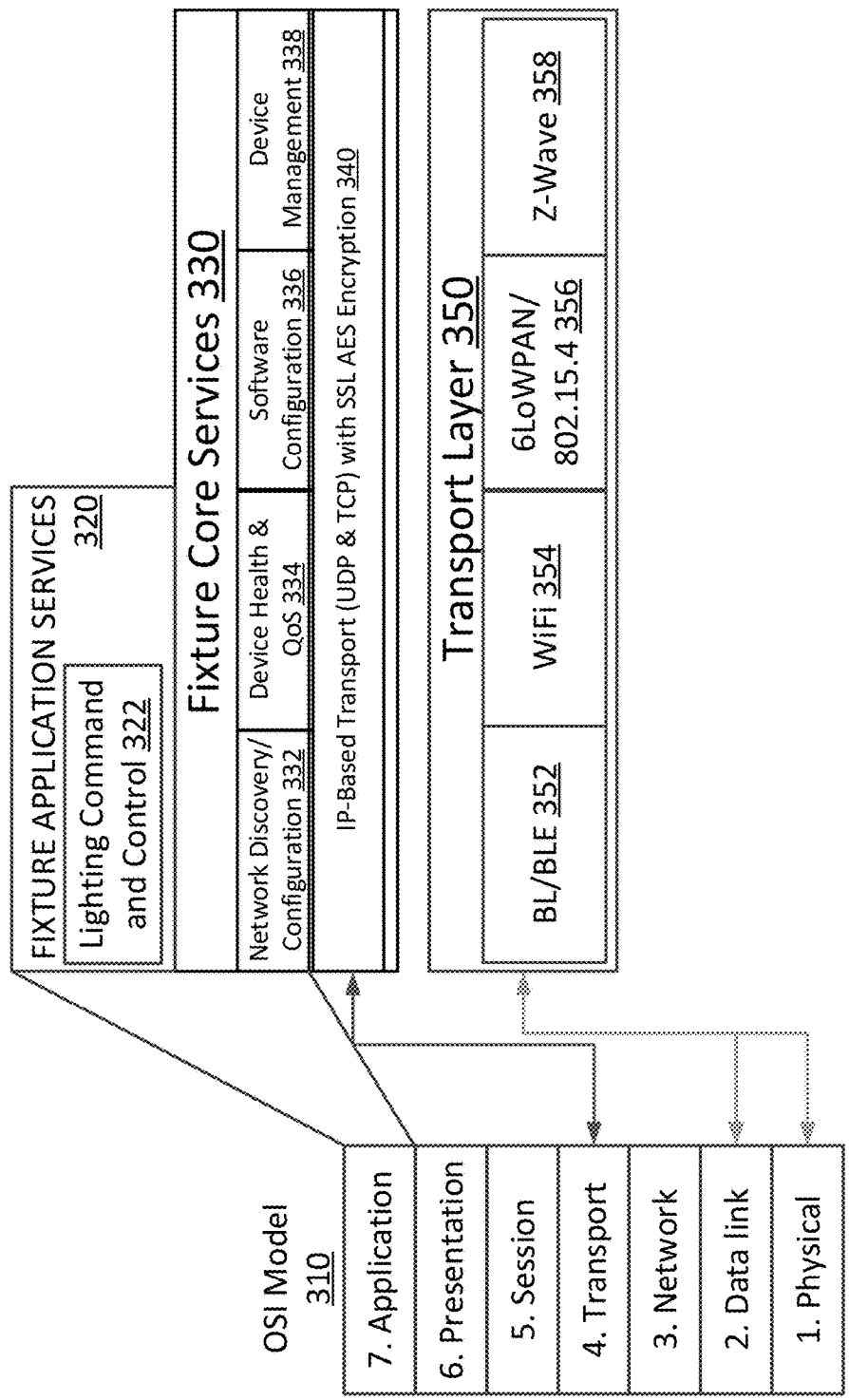
FIG. 3 illustrates an example network architecture with respect to the OSI model and the core services and fixture application services located within the application layer of the OSI model, according to an embodiment of the present disclosure.

The techniques described herein can be used to address each of the problems associated with traditional lighting systems, according to some embodiments. The techniques are scalable in the sense that there is no limitation to the maximum number of fixtures and controllers. Additionally, the techniques scale across networking physical layer platforms as they are agnostic to the OSI layers 1&2 (Physical and Datalink). In one such embodiment, a communication layer configured with the techniques provided herein resides at the Application layer, layer 7. In addition, a security aspect may reside in the Transport Layer (Layer 4) and is dependent on the transport. Therefore, in one such embodiment, the network architecture can use, for example, SSL AES 128-bit encryption. FIG. 3 shows the various layers according to one example embodiment and will be discussed in turn.

As previously explained, communication between the controller and the fixture is closed-loop, in which the controller is able to query for and receive information about the current illumination state of a fixture. As also previously explained, the system provides mechanisms to upgrade the software once actively being used or otherwise deployed, for example in a residential or commercial setting. In addition, the ability for devices on the network to be aware of the fixture state opens up the possibility for fixture diagnostics. This state information is beneficial for the network and controller as it can provide, for instance, the current health state of the fixture, communication status, and perform software versioning. This information is useful in notifying other devices on the network of problems with the fixture, and thus allows for closed-loop communication or feedback that is lacking from other systems. By such closed-loop querying and reporting, overall bandwidth can be reduced by sending specific messages and thus avoiding the unnecessary repetition, which would otherwise increase bandwidth consumption.

FIG. 1 illustrates an example block diagram of a connected lighting network system having a plurality of lighting fixtures coupled to a controller, configured in accordance with an embodiment of the present disclosure. As can be seen, a controller 110 is coupled to a plurality of lighting fixtures, including lighting fixture #1 (123), lighting fixture #2 (124), up to any number of lighting fixtures, denoted as fixture #N (125). The controller 110 can be coupled to the lighting fixtures 123, 124 and 125 over a network via direct electrical wiring or wireless communication (e.g. LAN, WAN, Wi-Fi®, Bluetooth, BLE, etc.). The controller 110 is configured to send query messages and command messages 111 to the lighting fixture 123, and the lighting fixture 123 is configured to send reply messages 112. The lighting fixture 123 can be further configured to a send query message 113 to the controller 110 and the controller can send a reply message 114. Similarly, the controller 110 is configured to send query messages and command messages 115 to the lighting fixture 124, and the lighting fixture 124 is configured to send reply messages 116. The lighting fixture 124 can be further configured to send query message 117 to the controller 110 and the controller can send a reply message 118 to the lighting fixture 124. As can be seen, the controller 110 is similarly configured to send query messages and command messages 119 to the lighting fixture 125, and the lighting fixture 125 is configured to send reply messages 120. The lighting fixture 125 can be further configured to send query message 121 to the controller 110 and the controller can send a reply message 122 to the lighting fixture 125. The query, command and reply messages are described in greater detail herein with respect to the various services provided.

The system includes a router 130 that is coupled to the lighting fixtures 123, 124 and 125 via direct electrical wiring or wireless communication links. In some embodiments, the lighting fixtures 123, 124 and 125 can communicate with the controller 110, and the controller 110 can be coupled to the router 130 to allow the lighting fixtures to communicate with the router 130 via the controller 110. In any case, the router 130 provides a local area network that allows the various local devices (e.g., fixtures 123-125 and controller 110) access to a wide area network, such as the Internet or a campus-wide network that includes a cloud-based service provided by the server 150.

The Cloud and network storage 140 is a network-based application under control of a server (e.g., server 150 having a database 155) for storing and accessing data. Access to the local area network by the Cloud based service can enable monitoring systems of connected fixtures locally. The Cloud based service could store, for example, user settings or lighting presets that is saved across one or more local area networks. This is useful when deployments of connected fixtures are in various retail stores, for instance, and when an updated seasonal lighting scene is stored in the Cloud based service, each store of networked fixtures can access this new scene.

Communications between all client devices follow an IP-based protocol, for example either TCP or UDP. In accordance with an embodiment, communications is performed through an IP socket transmission and device connectivity is evaluated through the Liveliness Service. The protocol follows a message oriented scheme where each message contains a header and payload specific to that message. Communication can involve messages that are based upon a query/report/ACK mechanism, periodicity, or event driven. The network architecture falls under the Network and Application layer of the OSI. FIG. 3 depicts the layers of the OSI model according to an embodiment and as will be discussed in turn.

Nodes on a network are classified in two different ways: a controller that initiates control commands and sends commands to other nodes; and a device which receives and executes the commands. Device nodes may be instructed to forward commands to other nodes. Within these two classifications, there are further delineations into specific kinds of controllers and devices, which allow for a number of services. Controllers maintain a full routing table of the network, and can monitor any changes or additions in a network's topology, determining the optimal and fastest routes for routing messages from a controller to any node on the network. Certain controllers also provide network information to the potential multiple controllers that may be on a network, or to serve as a bridge from a Z-wave network to a non Z-wave network.

Devices can also be further classified, allowing for devices that store static routes and can send messages, or devices that have a real time clock which can be used to execute timed commands, or have an EEPROM for storing application data.

Core and Application Services

Figure 2:
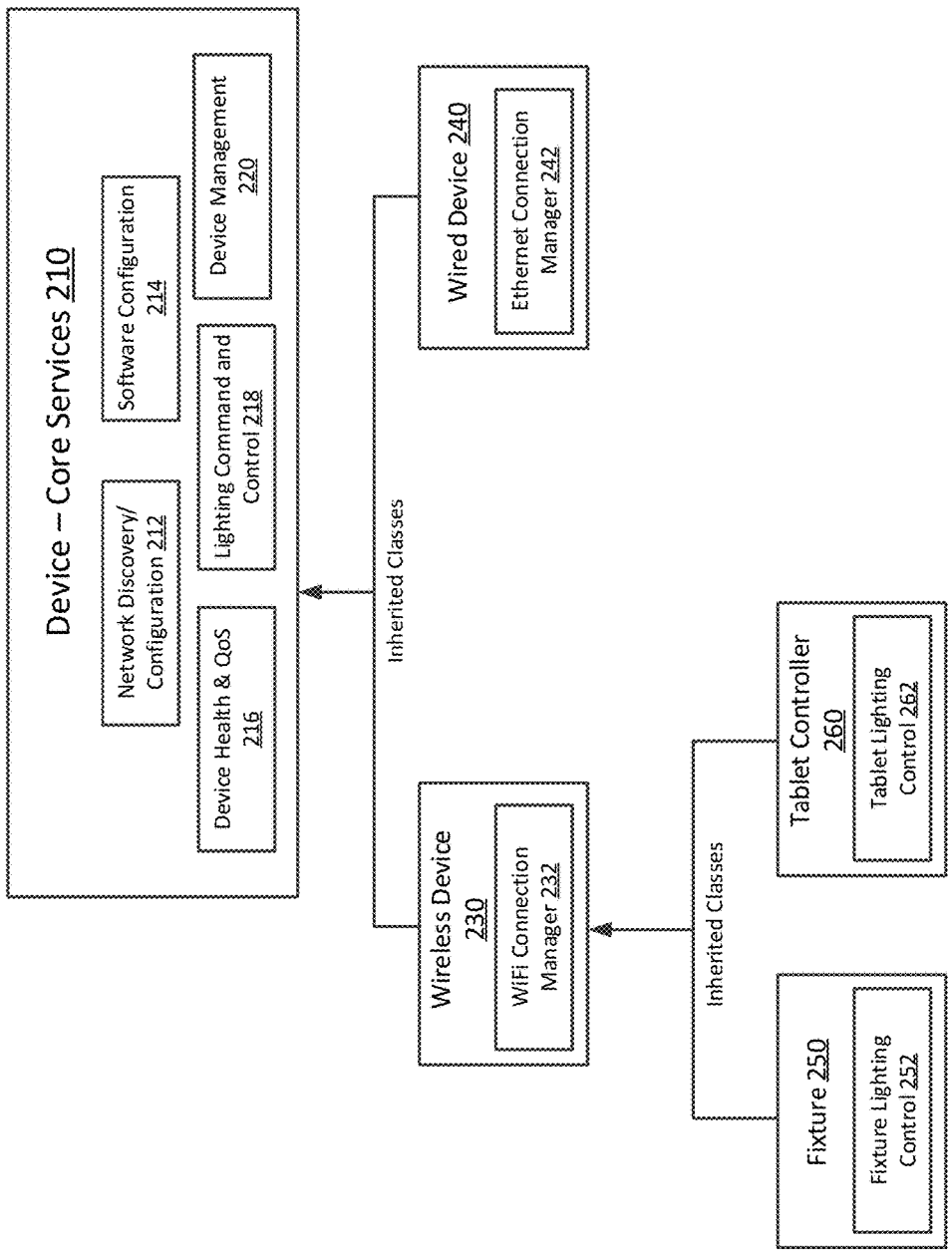
FIG. 2 illustrates an example Unified Modeling Language (UML) class diagram showing core services and inherited classes for a lighting fixture and a tablet controller, in accordance with an embodiment of the present disclosure.

Every device on the network includes a set of Core Services and Application Services. This separation allows for different types of devices with specific functionality to be specified through the Application Service. FIG. 2 shows the UML Class diagram of the Object-Oriented design for the Core and Application Services, according to an embodiment. The Core Services 210 includes Network Configuration & Discovery 212, Software Configuration 214, Device Health and QoS 216, and Device Management 220. The fixture Application Service is the Lighting Command & Control service 218. A Connection Manager 232, 242 service can be defined for devices 230, 240 that do not have operating systems for either wireless or wired connectivity dependent on the physical transport (e.g., Wi-Fi®, Ethernet, 802.15.4, Bluetooth, etc.). A fixture 250 includes a fixture lighting control override 252, and a tablet controller 260 includes a tablet lighting control override 262, which are inherited classes of a wireless device 230, managed by the Wi-Fi® Connection Manager 232.

The network architecture of this example embodiment is based upon a set of core software services that define how each device on the network should communicate. The network communication between devices is a message-based mechanism, where unique messages correspond to specific functionality also known as machine-machine (M2M) connectivity. Each device on the network is considered a "smart" device including the fixture, meaning it can communicate intelligently to each device on the network using messages, according to some embodiments. The fixture microcontroller unit (MCU) may run a flavor of an operating system (OS) or real-time operating system (RTOS) capable of performing multitasking operations. The fixture is able to measure and monitor the status of each channel including illumination, current, or duty cycle. The Lighting Command and Control service along with the other services can be, for example, part of a software communications library or stack. FIG. 3 shows the architecture with devices, according to an embodiment.

FIG. 3 illustrates an example network architecture services with respect to the OSI model and the core services and fixture application services located within the application layer of the OSI model, according to an embodiment of the present disclosure. The OSI model 310 includes a physical layer (Layer 1), a data link layer (Layer 2), a network layer (Layer 3), a transport payer (Layer 4), a session layer (Layer 5), a presentation layer (Layer 6) and an application layer (Layer 7). The fixture application services 320 and the fixture core services 330 reside on the application layer (Layer 7) of the OSI model 310. Thus, the services reside within an application layer of the devices (e.g., lighting fixtures) in accordance with an embodiment of the present disclosure. The fixture application services 320 include the lighting command and control service 322. The fixture core services 330 include the network discovery and configuration service 332, the device health and quality of service 334, the software configuration service 336, and the device management service 338. The transport layer (Layer 4) includes an IP-Based Transport (for example UDP of TCP) with an SSL AES Encryption 340. The transport layer 350 of the device includes Bluetooth or Bluetooth low energy (BL/BLE) 352, Wi-Fi® 354, 6LoWPAN/802,15,4 356 and Z-Wave 358, which reside on the data link (Layer 2) and physical link (Layer 1) of the OSI model 310. The security aspect may reside in the Transport Layer (Layer 4) and is dependent on the transport, therefore, the proposed network architecture can use SSL AES 128-bit encryption but does not define the implementation, according to some such embodiments.

Examples of devices utilizing the network architecture illustrated in FIG. 3 may include lighting controllers, light fixtures, gateway devices, etc. but is not limited to what is mentioned here. The controllers are capable of controlling specific devices such as fixtures. Gateway devices establish network connectivity between devices and provide network status. In some embodiments, they are responsible for instantiating the server-side Network Discovery service to register newly acquired devices on the network. In addition, the controller or fixture maintains device communication status via the server-side Device Health & QoS service. Software version updates can also be pushed down from the Gateway to the other devices.

Network Discovery and Configuration Service

Figure 4:
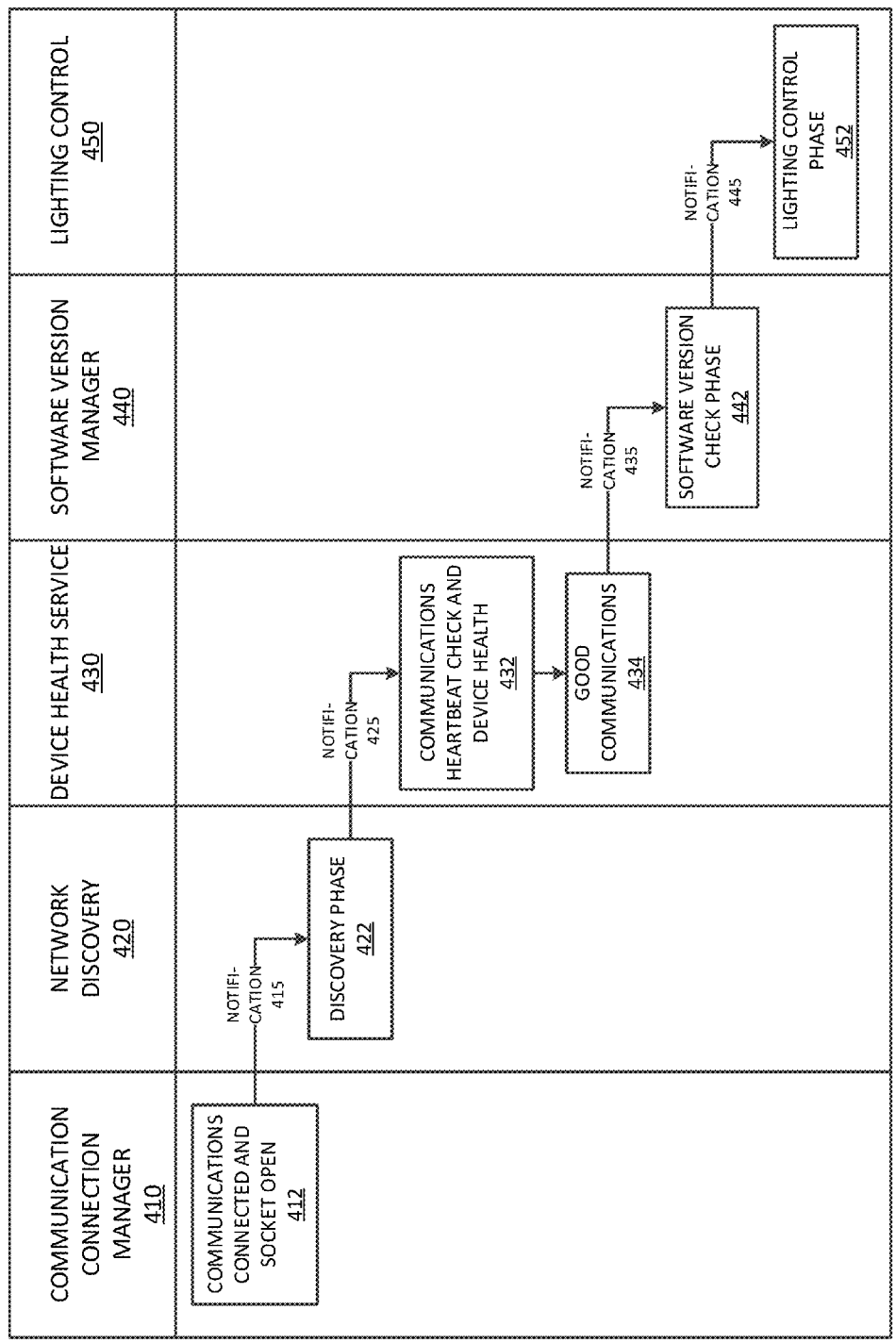
FIG. 4 illustrates an example UML activity diagram between the core services for the discovery phase, in accordance with an embodiment of the present disclosure.

FIG. 4 illustrates an example UML activity diagram between the core services for the discovery phase of a controller, in accordance with an embodiment of the present disclosure. The activity between the communication connection manager 410, the network discovery service 420, the device health service 430, the software version manager service 440 and the lighting command and control service 450 is shown with respect to the network discovery service. The network discovery service 420 can be classified as either being server-side or client-side. The communication connection manager 410 initiates communications and ensures communications are connected and the communication socket is open in phase 412. The communication connection manager 410 sends a notification 415 to the network discovery service 420 indicating communication has been established. During the discovery phase 422, the network discovery service 420 sends broadcast messages to initiate the discovery process. The client will respond to the querying server device if it has not already been discovered. Following the response, the server service will respond with an acknowledgment. At this point, the client is considered to be discovered (or known) by the server and the device state is configured. Once discovered the remaining services are able to be realized, the network discovery service 420 sends a notification 425 to the device health service 430 indicating that the device has been discovered. The device health service 430 performs a communications heartbeat check and device health check 432. If the device health service 430 finds good communications 434, it indicates that the device state is ready. A notification 435 is sent to the software version manager 440 indicating that communication has been established with the controller. The software version manager 440 may conduct a software version check phase 442 to check the software version that the client is currently running. Once that is complete, a notification 445 is sent to the lighting control service 450 for the lighting control phase 452 indicating that the communication has been established with the controller.

Liveliness and Device Health Service

The device health service can either be classified as a server-side or client-side service and initiates after network discovery has completed. In this service, and according to one embodiment having a server, the server periodically queries discovered clients, and each client replies with a return message. The number of replies is tallied by the server over a look-back time interval. Using Table 1 below, the client's connectivity health can be evaluated.

Suppose that the message sending rate is 1 message per second, and the look-back duration is 10 seconds.

TABLE 1

Communication Status Determination

| Messages during duration | received look-back | Device Health Status |
|---|---|---|
| 8-10 messages | | Great communication |
| 4-7 messages | | Good communication |
| 1-3 messages | | Bad communication |
| 0 messages | | No communication |

As the server tracks the device health of each connected client, this information can be used for diagnostic work. Should a client have a device health status of "No Communication", it can be removed from a discovered clients list.

Figure 5:
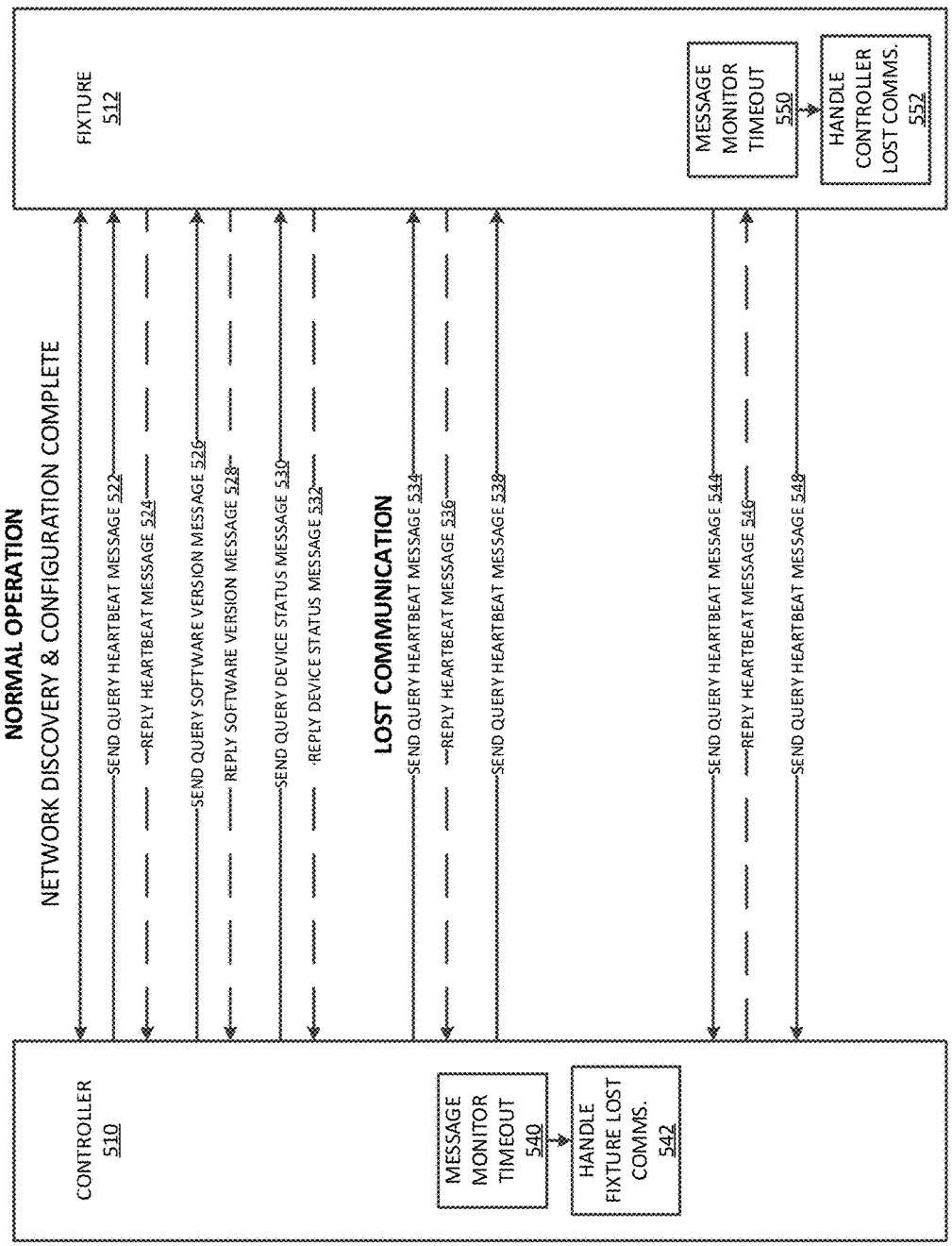
FIG. 5 illustrates an example device health activity diagram between the controller and a lighting fixture, configured in accordance with an embodiment of the present disclosure.

Reference is made to FIG. 5 illustrating an example device health activity diagram between the controller and a lighting fixture, in accordance with an embodiment of the present disclosure.

After network discovery and configuration is complete, during normal operation, controller 510 sends a query heartbeat message 522 to fixture 512, and the fixture 512 replies with a reply heartbeat message 524. The controller 510 sends a query software version message 526, and the fixture 512 replies with a reply software version message 528, indicating the software version that resides on the fixture 512. The controller 510 sends a query device status message 520 to the fixture 512, and the fixture 512 replies with a reply device status message 532. During normal operation, the controller 510 continues to send query messages to the fixture 512, and the fixture 512 continues to send reply messages. As described herein with reference to Table 1, the number of reply messages can be used to determine if a lost communication event occurs. For example, when the controller 510 sends the query heartbeat message 534 to the fixture 512, and the fixture 512 then replies with a reply heartbeat message 536, then the controller 510 sends a query heartbeat message 538 to the fixture 512. The controller 510 can implement a message monitor timeout 540 which determines that a predetermined amount of time has passed since a reply message has been received, or that the messages received during the duration indicated bad or no communication. In such cases the controller 510 can indicate to the fixture 512 to handle the lost communications 542. Likewise, the communication between the fixture 512 and the controller 510 can be verified by sending a query heartbeat message 544 from the fixture 512 to the controller 510, and then a reply heartbeat message 546 is sent from the controller 510 to the fixture 512, and then a query heartbeat message 548 is sent from the fixture 512 to the controller 510. The fixture 512 can implement a message monitor timeout 550 which determines that a predetermined amount of time has passed since a reply message has been received, or that the messages received during the duration indicated bad or no communication. In such cases the fixture 512 can indicate to the controller 510 to handle the lost communications 552.

Device Status Service

The device status service can either be classified as server-side or client-side and is initiated after the network discovery process completes. According to an embodiment, the server queries a client by sending a unicast message. The client responds with information about itself, including: the current state of the client with respect to its internal state machine, the operational status of the client, any errors it has detected, temperature, and any descriptive information about the client including but not limited to: client type, # of channels, form factor. The server (e.g. server 150 of FIG. 1) stores this information about the client, of which can be used later for diagnostic work. Refer, for example, to FIG. 5.

Lost Communications

Figure 6:
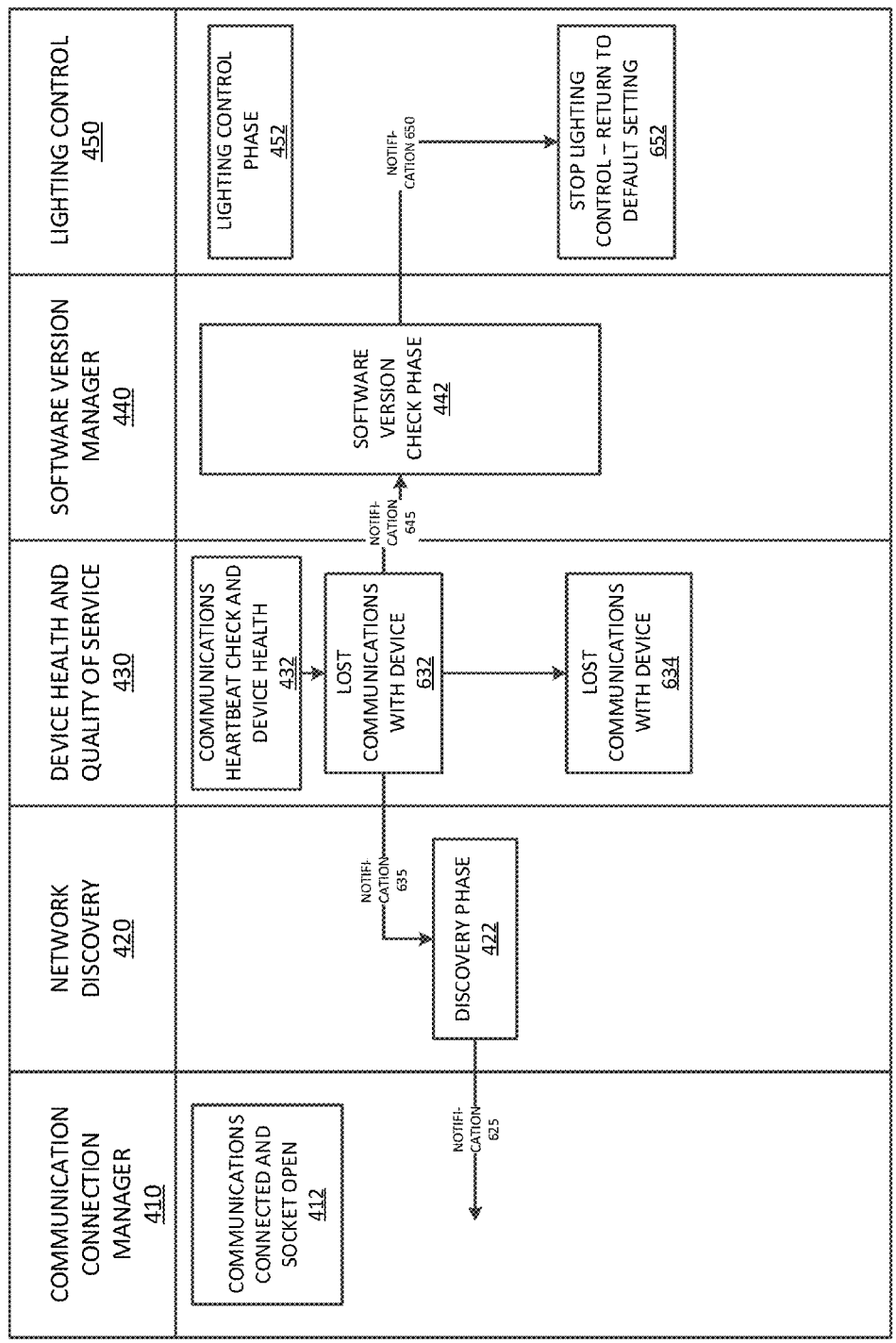
FIG. 6 illustrates an example UML activity diagram between the services within the device during a lost communications event, configured in accordance with an embodiment of the present disclosure.

FIG. 6 illustrates an example UML activity diagram between the services within the device during a lost communications event, in accordance with an embodiment of the present disclosure.

When the device health service 430 indicates that the controller has lost communications with the device, the device health service 430 sends a notification 635 to the network discovery service 420 indicating that communications have been lost, and the device state changes to error. A lost communications notification 625 is sent to the communication connection manager 410. The device health service 430 also initiates a lost communications with device process 634 and the device state changes to configured. The device health service 430 also sends a notification 645 of lost communication to the software version manager 440, and this notification of lost communication is passed to the lighting control service as notification 650. In response to receiving this message, the lighting control service 450 stops lighting control and returns to a default setting 652.

Software Versioning Service

Figure 7:
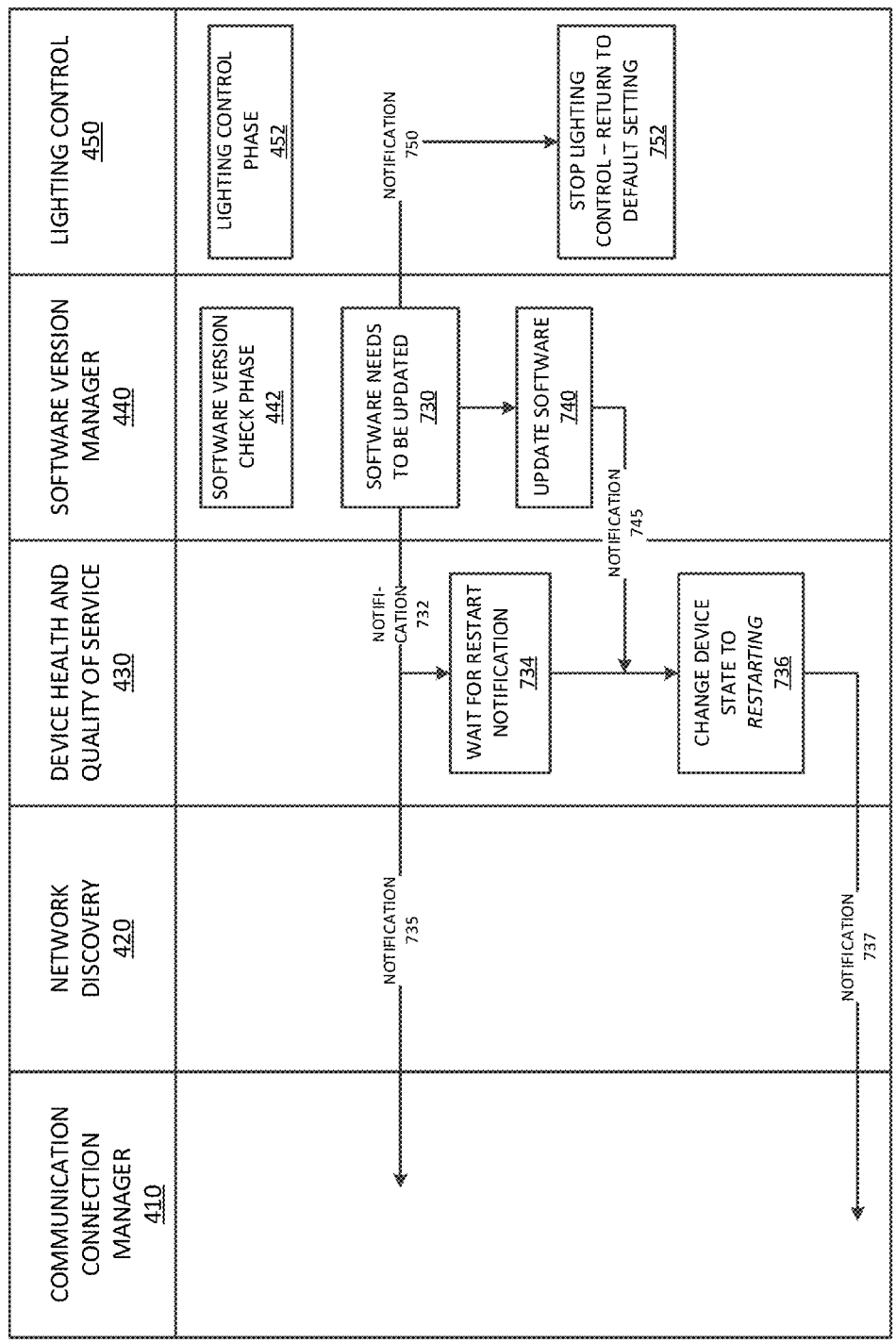
FIG. 7 illustrates an example UML activity diagram between the services when performing the software updating on the fixture device, in accordance with an embodiment of the present disclosure.

FIG. 7 illustrates an example UML activity diagram between the services when performing the software updating on the fixture device, in accordance with an embodiment of the present disclosure.

In accordance with an embodiment, the software versioning service is a server-side and client-side service that initiates after network discovery has completed. In this service, the server periodically (or in response to an event) queries a discovered client, and the client replies with information about its current firmware version. If a client's firmware is out of date, the server initiates a firmware update. Here, the server transmits the latest firmware package to the client, which then the client updates its own firmware.

With reference to FIG. 7, the software version manager 440 performs a software version check phase 442 and determines that the software should be updated 730. A notification 732 is sent from the software version service 440 to the device health service 430, indicating that the software should be updated. The device health service 430 sends a notification 735 that the software should be updated to the network discovery service 420 and the communication connection manager 410. The device health service 430, upon receiving the notification 732 from the software version service 440, waits for a notification of restart 734, and then changes the device state to restarting 736 when the appropriate notification is received from the software version service 440. The software is also updated 740 by the software version service 440 in response to determining that the software needs to be updated 730. After the software is updated, a software update completed notification 745 is sent to the device health service 430, and the device state is changed to restarting 736. A device restart notification 737 is then sent to the network discovery service 420 and the communication connection manager 410. The software version service 440, upon determining that the software should be updated 730, also sends a notification 750 to the lighting command and control service 450, indicating that the software should be updated. The lighting command and control service 450 then stops the lighting control and returns to the default settings 752.

Lighting Command and Control Service

The Lighting Command & Control service defines messages for a commanded specific illumination/dimming level (duty cycle percentage) and the reported achieved illumination/dimming level by the fixture, according to an embodiment.

Figure 8:
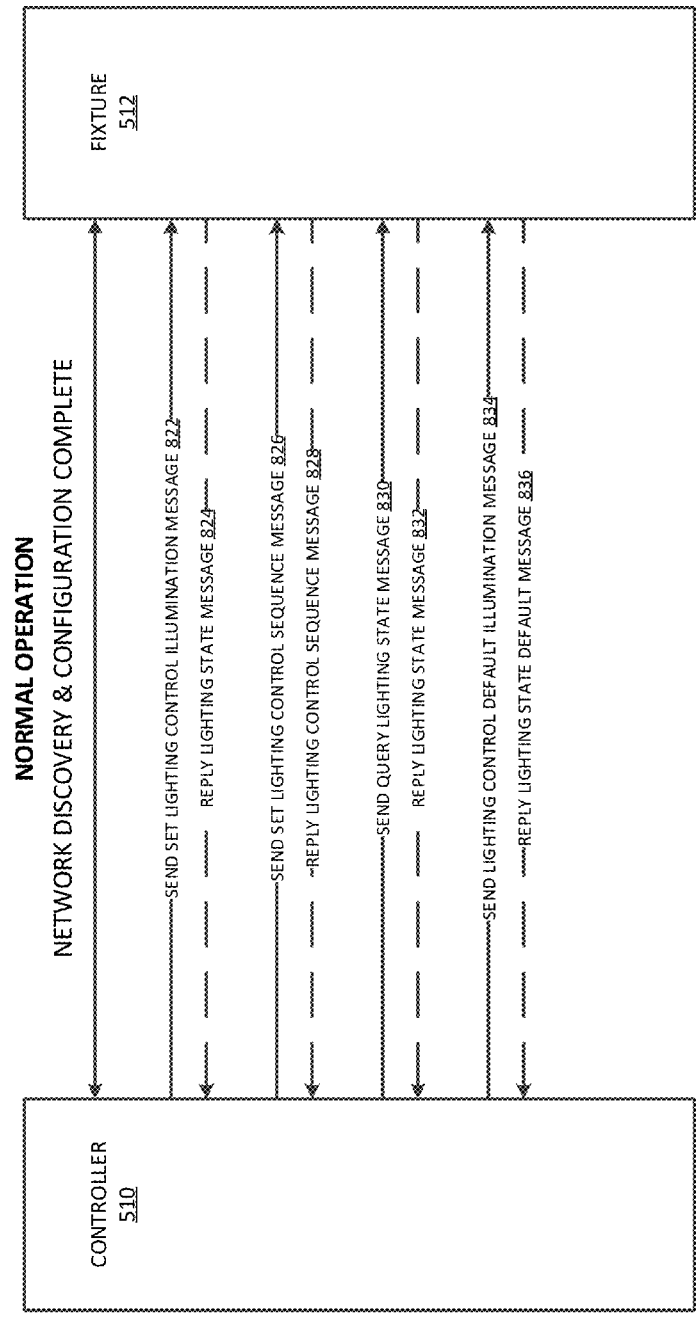
FIG. 8 illustrates an example UML activity diagram for a lighting command and control, in accordance with an embodiment of the present disclosure.

FIG. 8 shows an example UML Activity Diagram of the controller and fixture communication for lighting control, in accordance with an embodiment of the present disclosure. The controller can initiate a lighting command once it has discovered a fixture.

During normal operation, after network discovery and configuration is complete, and liveliness shows no connection issues, the lighting command and control service can operate in accordance with the techniques of the present disclosure. The lighting command and control service initiates with the controller 510 sending a set lighting control illumination message 822, once the controller has discovered the fixture. Once the fixture 512 receives the command, the fixture 512 will change the illumination accordingly and report back the achieved illumination or dimming level or duty cycle via a reply lighting state message 824. The reply lighting state message 824 can, for example, include information about the lighting state of the lighting fixture, including an illumination level, a dimming level, duty cycle for PWM controlled lighting fixtures, or other state or setting of the lighting fixture or device, such as device type, number of channels, form factor, operational status of the device, temperature, errors detected by the device, and any other descriptive information about the device. This information can be used by the controller or an appropriate server for diagnostic or analytic purposes.

In some embodiments, the controller may be configured to send a set lighting control sequence message 826 to the fixture 512 that specifies an illumination sequence (e.g., changing illumination levels over time) for one or more channels, and the fixture 512 may be configured to send a reply lighting control sequence message 828 after implementing the illumination sequences. In some embodiments, the controller 510 may be configured to send a query lighting state message 830 to the fixture 512 querying the status of the one or more channels, and the fixture 512 may be configured to send a reply lighting state message 832 that specifies the current state of the one or more channels. In some embodiments, the controller 510 may be configured to send a lighting control default illumination message 834 to the fixture 512 that specifies a default illumination setting for each of the channels, and the fixture 512 is configured to send a reply lighting state default message 836 to the controller 510 after implementing the default illumination setting. Communication between the controller 510 and the fixture 512 can continue by sending query or command and reply messages between the controller and the fixture 512 in accordance with the techniques disclosed herein.

Figure 9:
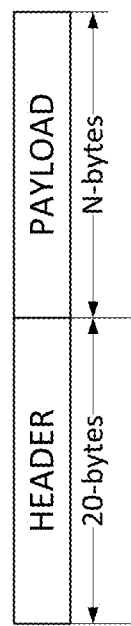
FIG. 9 illustrates an example message packet structure including 20 bytes for the heater and N-bytes for the payload, in accordance with an embodiment of the present disclosure.

In accordance with the present disclosure, each message can include a header structure that contains 20 bytes and a payload structure. Some messages such as query messages may just contain header information. The entire packet is in little endian format. An example message packet structure is shown in FIG. 9, including 20 bytes for the heater and N-bytes for the payload, where N can be any number as appropriate for the payload of the message.

The header provides basic message definition that includes, for example, message ID, source and destination ID, message rate, sequence number, and payload length. Example data types, their corresponding size (in bytes) and integer representation are shown in Table 2, according to an example embodiment.

TABLE 2

Message data type definition.

| Data Type | Size (in bytes) | Representation |
|---|---|---|
| Byte | 1 | 8 bit unsigned integer |
| Short Integer | 2 | 16 bit signed integer |
| Integer | 4 | 32 bit signed integer |
| Long Integer | 8 | 64 bit signed integer |
| Unsigned Short Integer | 2 | 16 bit unsigned integer |
| Unsigned Integer | 4 | 32 bit unsigned integer |
| Unsigned Long Integer | 8 | 64 bit unsigned integer |
| Float | 4 | IEEE 32-bit Floating Point |

TABLE 3

Message Header Definition

| Field # | Field Description | Data Type | Size (Bytes) | Data Range | |
|---|---|---|---|---|---|
| 0 | Message Properties | Unsigned Short | 2 | *See Reference not found. | Error source! |
| 1 | Message ID | Unsigned Short | 2 | 0x0100 - 0xFFFE | |
| 2 | Source ID | Unsigned Short | 2 | 0x00 - 0xFFFE | |
| 3 | Source Group ID | Unsigned Short | 2 | | |
| 4 | Destination ID | Unsigned Short | 2 | 0x00 - 0xFFFE | |
| 5 | Destination Group ID | Unsigned Short | 2 | | |
| 6 | Message Rate | Unsigned Short | 2 | 0x00 - 0xFFFE | |
| 7 | Sequence Number | Unsigned Short | 2 | 0x00 - 0xFFFE | |
| 8 | Payload Length | Unsigned Int | 4 | 0x00 - 0xFFFFFFFE | |
| | | Total | 20 | | |

Table 3 shows example message header definitions in accordance with an embodiment of the present disclosure.

The payload section for both the command and query messages contain a multi-byte bit pattern called a Channel Illumination Field (CIF) that indicates which lighting channel is to be commanded or reported, and the following payload indicates the illumination/dimming level or duty cycle for PWM controlled fixtures. Therefore, not all channels' commanded levels may be transmitted to the fixture in a single message. This addresses the issue with the previously mentioned lighting control protocols, in which all channels are transmitted to change a single channel dimming level. Table 4 shows an example lighting control message payload format to command a specific dimming level. Each bit starting from bit location 1 indicates in binary value if the corresponding channel needs to be updated. Table 5 shows an example lighting reporting message payload format to report a specific illumination or dimming level.

TABLE 4

Set Lighting Control Illumination Payload Format

| Field # | Field Description | Data Type | Data Value |
|---|---|---|---|
| 0 | Channel Illumination Field (CIF) | Unsigned Long | 0x01 - 0x03FFFFFFFFFFFFFE |
| 1 | Illumination Area 1 | Unsigned Byte | Percent Range: 0-100% Scale: 1 Data Range: 0-100 Res: 1% -> 1 |
| 2 | Illumination Area 2 | Unsigned Byte | Percent Range: 0-100% Scale: 1 Data Range: 0-100 Res: 1% -> 1 |
| — | | | |
| 61 | Illumination Area 61 | Unsigned Byte | Percent Range: 0-100% Scale: 1 Data Range: 0-100 Res:1% -> 1 |

TABLE 5

Report Lighting State Payload Format

| Field # | Field Description | Data Type | Data Value |
|---|---|---|---|
| 0 | Channel Illumination Field (CIF) | Unsigned Long | 0x01-0x03FFFFFFFFFFFFFE |
| 1 | Illumination Area 1 | Unsigned Byte | Percent Range: 0-100% Scale: 1 Data Range: 0-100 Res: 1% -> 1 LED 1 Fault Detected: 255 |
| 2 | Illumination Area 2 | Unsigned Byte | Percent Range: 0-100% Scale: 1 Data Range: 0-100 Res: 1% -> 1 LED 2 Fault Detected: 255 |
| — | | | |
| 61 | Illumination Area 61 | Unsigned Byte | Percent Range: 0-100% Scale: 1 Data Range: 0-100 Res: 1% -> 1 LED 61 Fault Detected: 255 |

For example, if CIF=0x02 indicating bit location 1 is set high, then the first byte after the CIF will correspond to channel 1. Similarly, if channel 2 needs to be fully ON (value=100) and channel 15 needs to be at half illumination (value=50), then the CIF=0x8004. The following two bytes after the CIF will correspond to channel 2 and 15 respectively in that order. The subsequent bytes following the CIF correspond to channels in numerical order. Table 7 shows the payload format for this example.

TABLE 7

Payload format for channel 2 and 15 to be fully ON.

| | CIF Most Significant Byte | CIF Least Significant Byte | Ch 2 Illumination Level | Ch15 Illumination Level |
|---|---|---|---|---|
| Hex | 0x80 | 0x04 | 0x64 (ON) | 0x32 (ON) |
| Binary | 10000000b | 00000100b | 01100100b | 00110010b |

If the illumination levels for the channels to be changed are the same, then we include a single illumination level in the payload. Using the previous example, if channel 2 and 15 are both to be set to fully ON (value=100), then the following the byte after the CIF will be 0x64. This concept can be applied to not only illumination levels but scene sequences, color, hue, saturation, and other lighting control parameters.

Data Analysis

Figure 10:
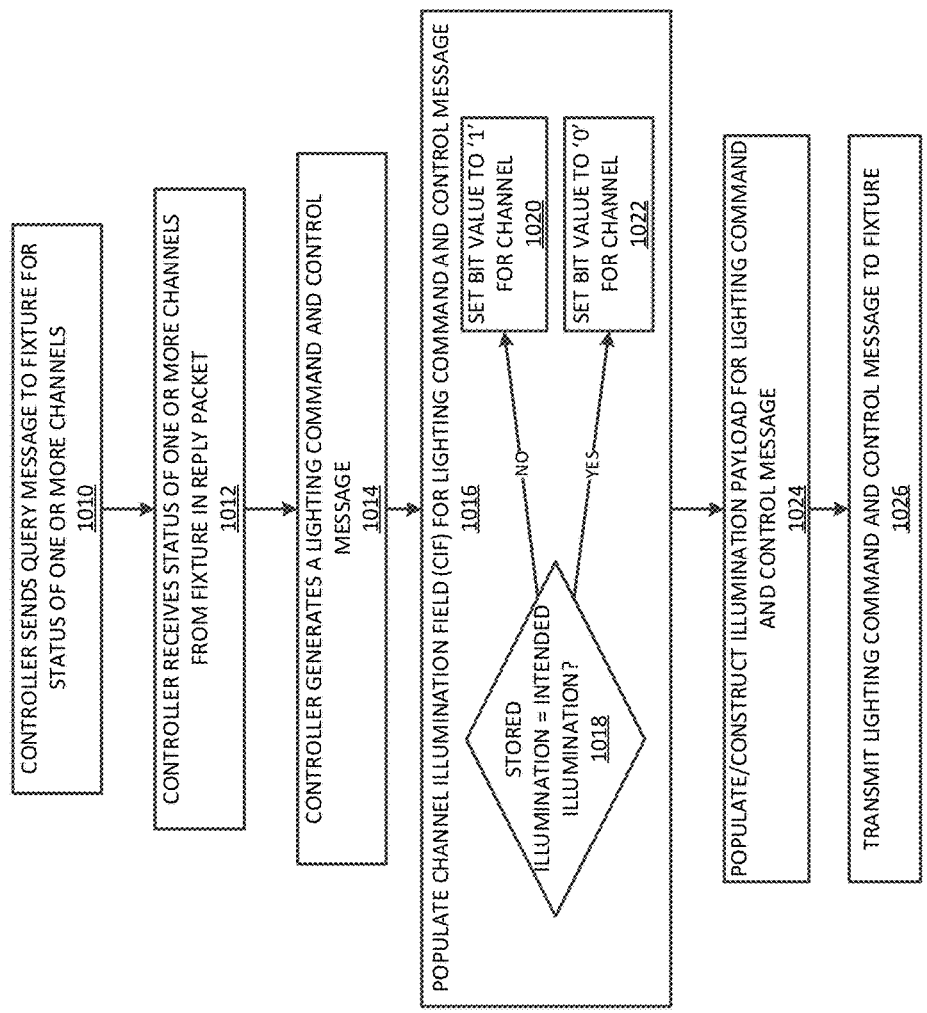
FIG. 10 illustrates a methodology for providing a connected lighting network system having lighting command and control that uses message-based communications for multi-channel lighting fixtures, in accordance with an embodiment of the present disclosure.

FIG. 10 illustrates a methodology for providing a connected lighting network architecture system having lighting command and control that uses message-based communications for multi-channel lighting fixtures, in accordance with an embodiment of the present disclosure. The method may be performed by a controller communicatively coupled to one or more lighting fixtures, each lighting fixture having a plurality of channels.

Using the lighting control messaging scheme in accordance with the present disclosure, the lighting state from multi-channel lighting fixtures can be retrieved using a periodic (or event based) querying and reporting. The controller sends a query message to the fixture requesting the status of the plurality of channels of a multi-channel lighting fixture in block 1010. The status may include the illumination level for each channel, as well as other illumination parameters (e.g., color, hue, saturation). The controller then receives the status of the one or more channels from the multi-channel lighting fixture in a reply packet in block 1012. With the received packet, the controller updates and stores a local copy of the fixtures' illumination levels (e.g., server 150 storing in database 155 via the router 130 and cloud and network storage 140). Using this feedback, the controller always has information about the current status of each channel illumination level for each fixture. Using this knowledge, the controller can command new lighting control messages in block 1014.

As a reminder, a lighting control message may be a CIF that indicates the channels to be changed, and a payload of the intended illumination levels for those channels. The CIF is N+1 bits in length, where N is the total number of fixture channels, and each bit of the CIF refers to a particular fixture channel.

When a new command is generated, the controller may populate the CIF for the lighting command and control message in block 1016. The new command is based on the intended illumination levels for one or more channels in the multi-channel lighting fixture. In block 1018, the controller performs a comparison between the intended and stored (e.g., received from the fixture) illumination levels for those channels. This comparison will populate the CIF through the following:

At block 1020: if a channel's intended illumination is different than what is stored, this channel's bit value is flagged with a '1'.

At block 1022: if there is no difference between the intended illumination and what is stored for a channel, the channel's bit value is otherwise a '0'.

Once the CIF is populated, the illumination payload is constructed in block 1024. This payload includes a sequentially concatenated series of illumination levels—stored in byte format—one for each channel that has been flagged in the CIF. Thus, the general lighting command and control (LCC) message contains an equal number of illumination level commands and flagged CIF bits. The LCC message can include an equal number of illumination level of commands and flagged CIF bits when multiple channels are to be changed to differing illumination levels, and in some embodiments the LCC message can include a single illumination level in a broadcast message when the intended illumination level is the same across all channels to be changed. The LCC message is then transmitted to the in block 1026. In this manner, the controller may communicate with and control multiple lighting fixtures sequentially, simultaneously, or in any other order.

There is at least one exception to the LCC message including a single illumination level. For example, if the intended illumination level to be changed is the same across all of the channels to be changed, a single illumination value is included in the payload. Here, this single illumination level may be applied to each of the channels to be changed. This kind of message is called a LCC broadcast message.

Bit Analysis

The savings in bandwidth afforded with the techniques herein are apparent when a bit analysis is performed. The bitwise cost of these messages is compared to a standard (e.g., uni-directional, and lacking feedback from the fixtures) lighting control message. According to this analysis, assume that N is the total number of channels, and K is the number of channels to be changed. An example protocol configured in accordance with an embodiment of the present disclosure is illustrated in Table 8. As can be seen, 20 bytes are allocated to the header.

TABLE 8

Bit Usage Comparison

| | LCC General Message | LCC Broadcast Message | Standard Control Message |
|---|---|---|---|
| Message Header (including other information) | 20 bytes = 160 bits | 20 bytes = 160 bits | 35 bits minimum (ranges up to 1,000,011 bits maximum) |
| Payload (CIF) | N + 1 bits | N + 1 bits | — |
| Payload (illumination levels) | K bytes = 8K bits | 1 byte = 8 bits | — |
| Payload (general) | N + 8K + 1 | N + 9 | 11N |
| Total Cost: | N + 8K + 161 bits | N + 169 bits | 11N + 35 bits |

Since K≤N, we can solve for when a LCC message conserves more bits than a standard control message.

An LCC Broadcast Message will contain fewer or equal bits than a standard control message when the total number of channels N≥14. A LCC General Message contains fewer or equal bits when N≥4K/5+12.6. With this inequality, LCC General Message can outperform a standard control message in bit savings.

Furthermore, by choosing a few scalar relations between N and K, it is apparent the smallest total number of channels N to be able to have bitwise savings compared to a standard message.

TABLE 9

Solution Space

| Scalar Relation | N: Total Number of Channels | K: Number of Channels to be changed |
|---|---|---|
| If K = N | 63 | 63 |
| If K = 3N/4 | ≈32 | ≈24 |
| If K = N/2 | ≈21 | ≈11 |
| If K = N/3 | ≈18 | ≈6 |
| If K = N/4 | ≈16 | ≈4 |

The connected lighting fixture network system and services disclosed herein provide several advantages and benefits over standard lighting systems implementing uni-directional and open-loop communication systems. The system disclosed herein provides bi-directional communication where a controller and a lighting fixture are able to communicate with each other using unique command, query and reply messages to determine the status of a lighting fixture and appropriately deliver a message to the lighting fixture. This also reduces the overall bandwidth by providing messages that specify which channels need to be changed, rather than sending a unicast message for all lighting fixtures, requiring a change of all channels. It is also beneficial to know the state of the lighting fixtures, and other pertinent information regarding the lighting fixture, for a variety of reasons, including diagnostics, lighting command and control messages, and other advantages disclosed herein and apparent in light of the present disclosure.

Numerous variations and configurations will be apparent in light of the disclosure. For example, one example embodiment of the present disclosure provides a system having a plurality of multi-channel lighting fixtures that communicate over a network. The system includes a controller configured to send a first query message over the network to a first multi-channel lighting fixture in the plurality of multi-channel lighting fixtures, and the first multi-channel lighting fixture, in which the first multi-channel lighting fixture accesses one or more services to communicate with the controller and is configured to send a first reply message over the network to the controller in response to receiving the first query message. In some cases, the one or more services may reside in an application layer of the first multi-channel lighting fixture. In some cases, the one or more services may reside in an application layer of a server coupled to the first multi-channel lighting fixture or the controller. In some cases, the one or more services may include at least one of a network discovery service, a device health service, a device status service, a software version manager service and a lighting command and control service. In some cases, the first query message requests information from the first multi-channel lighting fixture regarding a current illumination state of one or more channels of the first multi-channel lighting fixture. In some cases, the first query message may be a discovery message and the first reply message indicates that the first multi-channel lighting fixture has not yet been discovered, and the controller is further configured to store information indicating that the first multi-channel lighting fixture is designated as a discovered device. In some cases, the controller may be further configured to tally a number of reply messages received from the first multi-channel lighting fixture to determine a connectivity health of the first multi-channel lighting fixture. In some cases, the first reply message may include at least one of: a current state of the first multi-channel lighting fixture, an operational status of the first multi-channel lighting fixture, an error detected by the first multi-channel lighting fixture, and a temperature of the first multi-channel lighting fixture. In some cases, the first reply message may include information about a current firmware or software version of the first multi-channel lighting fixture. In some cases, the system may further include a network router that is configured to communicate with the first multi-channel lighting fixture and the controller.

Another example embodiment of the present disclosure provides a method of controlling a plurality of multi-channel lighting fixtures. The method may include sending, by a controller, a first query message over a network to a first multi-channel lighting fixture in the plurality of multi-channel lighting fixtures, receiving, by the controller, a first reply message over the network from the first multi-channel lighting fixture, in which the first multi-channel lighting fixture accesses one or more services to generate the first reply message and communicate with the controller, generating, by the controller, a first command message for the first multi-channel lighting fixture based on the first reply message, and sending, by the controller, the first command message over the network to the first multi-channel lighting fixture. In some cases, the one or more services may reside in an application layer of the first multi-channel lighting fixture. In some cases, the one or more services may reside in an application layer of a server coupled to the first multi-channel lighting fixture or the controller. In some cases, the one or more services may include at least one of a network discovery service, a device health service, a device status service, a software version manager service and a lighting command and control service. In some cases, the first query message requests information from the first multi-channel lighting fixture regarding a current illumination state of one or more channels of the first multi-channel lighting fixture. In some cases, the first query message may be a discovery message and the first reply message indicates that the first multi-channel lighting fixture has not yet been discovered, and the method further includes storing, by the controller, information indicating that the first multi-channel lighting fixture is designated as a discovered device. In some cases, the method may further include tallying a number of reply messages received from the first multi-channel lighting fixture to determine a connectivity health of the first multi-channel lighting fixture. In some cases, the first reply message may include at least one of: a current state of the first multi-channel lighting fixture, an operational status of the first multi-channel lighting fixture, an error detected by the first multi-channel lighting fixture, and a temperature of the first multi-channel lighting fixture. In some cases, the first reply message may include information about a current firmware or software version of the first multi-channel lighting fixture.

The foregoing description of the embodiments of the disclosure has been presented for the purposes of illustration and description. It is not intended to be exhaustive or to limit the disclosure to the precise form disclosed. Many modifications and variations are possible in light of this disclosure. For example, the embodiments are shown and described with respect to a lighting fixture or another device; however the teachings should be readily applicable to any type of device, and not limited to the particular fixture or device shown or described. The devices can include any device such as a multi-channel lighting fixture or another smart device in accordance with the present disclosure. It is intended that the scope of the disclosure be limited not by this detailed description, but rather by the claims appended hereto.

What is claimed is:

1. A system having a plurality of multi-channel lighting fixtures that communicate over a network, the system comprising:
    a controller configured to send a first query message over the network to a first multi-channel lighting fixture in the plurality of multi-channel lighting fixtures; and
    the first multi-channel lighting fixture, wherein the first multi-channel lighting fixture accesses one or more services to communicate with the controller and is configured to send a first reply message over the network to the controller in response to receiving the first query message;
    wherein the controller is further configured to tally a number of reply messages received from the first multi-channel lighting fixture to determine a connectivity health of the first multi-channel lighting fixture.

2. The system of claim 1, wherein the one or more services reside in an application layer of the first multi-channel lighting fixture.

3. The system of claim 1, wherein the one or more services reside in an application layer of a server coupled to the first multi-channel lighting fixture or the controller.

4. The system of claim 1, wherein the one or more services comprise at least one of a network discovery service, a device health service, a device status service, a software version manager service and a lighting command and control service.

5. The system of claim 1, wherein the first query message requests information from the first multi-channel lighting fixture regarding a current illumination state of one or more channels of the first multi-channel lighting fixture.

6. The system of claim 1, wherein:
the first query message is a discovery message and the first reply message indicates that the first multi-channel lighting fixture has not yet been discovered; and
the controller is further configured to store information indicating that the first multi-channel lighting fixture is designated as a discovered device.

7. The system of claim 1, wherein the first reply message includes at least one of: a current state of the first multi-channel lighting fixture, an operational status of the first multi-channel lighting fixture, an error detected by the first multi-channel lighting fixture, and a temperature of the first multi-channel lighting fixture.

8. The system of claim 1, wherein the first reply message includes information about a current firmware or software version of the first multi-channel lighting fixture.

9. The system of claim 1, further comprising a network router that is configured to communicate with the first multi-channel lighting fixture and the controller.

10. A method of controlling a plurality of multi-channel lighting fixtures, the method comprising:
sending, by a controller, a first query message over a network to a first multi-channel lighting fixture in the plurality of multi-channel lighting fixtures;
receiving, by the controller, a first reply message over the network from the first multi-channel lighting fixture, wherein the first multi-channel lighting fixture accesses one or more services to generate the first reply message and communicate with the controller;
tallying a number of reply messages received from the first multi-channel lighting fixture to determine a connectivity health of the first multi-channel lighting fixture;
generating, by the controller, a first command message for the first multi-channel lighting fixture based on the first reply message; and
sending, by the controller, the first command message over the network to the first multi-channel lighting fixture.

11. The method of claim 10, wherein the one or more services reside in an application layer of the first multi-channel lighting fixture.

12. The method of claim 10, wherein the one or more services reside in an application layer of a server coupled to the first multi-channel lighting fixture or the controller.

13. The method of claim 10, wherein the one or more services comprise at least one of a network discovery service, a device health service, a device status service, a software version manager service and a lighting command and control service.

14. The method of claim 10, wherein the first query message requests information from the first multi-channel lighting fixture regarding a current illumination state of one or more channels of the first multi-channel lighting fixture.

15. The method of claim 10, wherein the first query message is a discovery message and the first reply message indicates that the first multi-channel lighting fixture has not yet been discovered, and wherein the method further comprises:
storing, by the controller, information indicating that the first multi-channel lighting fixture is designated as a discovered device.

16. The method of claim 10, wherein the first reply message includes at least one of: a current state of the first multi-channel lighting fixture, an operational status of the first multi-channel lighting fixture, an error detected by the first multi-channel lighting fixture, and a temperature of the first multi-channel lighting fixture.

17. The method of claim 10, wherein the first reply message includes information about a current firmware or software version of the first multi-channel lighting fixture.

* * * * *